United States Patent
deBeus

(10) Patent No.: US 8,159,688 B2
(45) Date of Patent: Apr. 17, 2012

(54) AUTOMATED SYSTEMS AND METHODS FOR PREPRESS WORKFLOW PROCESSING

(75) Inventor: Eric deBeus, Redondo Beach, CA (US)

(73) Assignee: Xerox Corporation, Norwalk, CT (US)

( * ) Notice: Subject to any disclaimer, the term of this patent is extended or adjusted under 35 U.S.C. 154(b) by 1078 days.

(21) Appl. No.: 12/042,920

(22) Filed: Mar. 5, 2008

(65) Prior Publication Data

US 2009/0225344 A1    Sep. 10, 2009

(51) Int. Cl.
*G06F 3/12* (2006.01)

(52) U.S. Cl. .................. 358/1.13; 358/1.15; 358/1.18; 358/1.1

(58) Field of Classification Search ........... 358/1.13, 358/1.15, 1.18, 1.1
See application file for complete search history.

(56) References Cited

U.S. PATENT DOCUMENTS

| | | | |
|---|---|---|---|
| 5,988,899 A * | 11/1999 | Benson et al. ............ 400/61 |
| 6,295,133 B1 | 9/2001 | Bloomquist et al. |
| 6,378,983 B1 | 4/2002 | Ito et al. |
| 6,380,951 B1 | 4/2002 | Petchenkine et al. |
| 6,411,396 B1 | 6/2002 | Benson et al. |
| 6,483,524 B1 | 11/2002 | Petchenkine et al. |
| 6,594,034 B1 | 7/2003 | Bloomquist et al. |
| 7,061,649 B2 | 6/2006 | Ikeda et al. |
| 7,242,487 B2 | 7/2007 | Lucivero et al. |
| 7,755,786 B2 * | 7/2010 | Foehr et al. ............ 358/1.15 |
| 2002/0054398 A1 | 5/2002 | Bloomquist et al. |
| 2006/0238803 A1* | 10/2006 | Kuroshima ............ 358/1.15 |

* cited by examiner

*Primary Examiner* — Benny Q Tieu
*Assistant Examiner* — Paul F Payer
(74) *Attorney, Agent, or Firm* — Pepper Hamilton LLP

(57) ABSTRACT

Methods and systems for adaptively deferring prepress operations are disclosed. A prepress workflow system may analyze a workflow to determine whether the performance of one or more prepress operations in the workflow can be deferred to a printing device. A deferred operations ticket may be stored corresponding to the workflow. The deferred operations ticket may contain one or more deferrable prepress operations. The prepress workflow system may receive a document to be processed by the workflow. The document and the deferred operations ticket may be sent to the printing device. The printing device may perform the one or more deferrable prepress operations contained in the deferred operations ticket on the document to produce a processed document and print the processed document.

14 Claims, 5 Drawing Sheets

AUTOMATED SYSTEMS AND METHODS FOR PREPRESS WORKFLOW PROCESSING

BACKGROUND

Automated prepress workflow systems typically perform a variety of prepress operations. Such systems typically process a digital document by performing a variety of operations on the document prior to sending it to a printer. For example, a prepress workflow system may scale, rotate or otherwise manipulate an image that is included in a document, format text into a particular font, size, color, language or orientation, or the like. Exemplary prepress systems include those described in U.S. Pat. No. 6,295,133 to Bloomquist et al.; U.S. Pat. No. 6,378,983 to Ito et al.; U.S. Pat. No. 6,380,951 to Petchenkine et al., U.S. Pat. No. 6,411,396 to Benson et al.; and U.S. Pat. No. 6,483,524 to Petchenkine et al.

In some cases, automated prepress workflow systems perform operations on page description language (PDL) documents, such as Portable Document Format (PDF) documents and PostScript (PS) documents. Once such prepress operations are performed, soft-proofing (i.e., displaying an exemplary digital rendering of one or more pages of a PDL document on a computer screen, display or other image-based system) can be performed on the documents. In addition, PDL documents can be submitted to a printing device for printing.

Performing prepress operations on large or complex PDL documents can be time-consuming and computationally intensive. Prepress operations could even fail if intermediate and/or final versions of a large PDL document are created because such versions may exhaust system resources during processing.

SUMMARY

Before the present systems, devices and methods are described, it is to be understood that this disclosure is not limited to the particular systems, devices and methods described, as these may vary. It is also to be understood that the terminology used in the description is for the purpose of describing the particular versions or embodiments only, and is not intended to limit the scope.

It must also be noted that as used herein and in the appended claims, the singular forms "a," "an," and "the" include plural references unless the context clearly dictates otherwise. Thus, for example, reference to a "document" is a reference to one or more documents and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments, the preferred methods, materials, and devices are now described. All publications mentioned herein are incorporated by reference. Nothing herein is to be construed as an admission that the embodiments described herein are not entitled to antedate such disclosure by virtue of prior invention. As used herein, the term "comprising" means "including, but not limited to."

In an embodiment, a method for adaptively deferring prepress operations for a workflow may include analyzing, by a prepress workflow system, a workflow to determine whether the performance of one or more prepress operations in the workflow can be deferred to a printing device, storing a deferred operations ticket containing one or more deferrable prepress operations corresponding to the workflow, receiving, by the prepress workflow system, a document to be processed by the workflow, sending the document and the deferred operations ticket to the printing device, performing, by the printing device, the one or more deferrable prepress operations contained in the deferred operations ticket on the document to produce a processed document, and printing the processed document.

In an embodiment, a system for adaptively deferring prepress operations for a workflow may include a prepress workflow system and a printing device in operable communication with the prepress workflow system. The prepress workflow system may be configured to receive a workflow, analyze the workflow to determine whether the performance of one or more prepress operations in the workflow can be deferred to the printing device, store a deferred operations ticket containing one or more deferrable prepress operations corresponding to the workflow, receive a document to be processed using the workflow, and send the deferred operations ticket and the document to the printing device. The printing device may be configured to perform the one or more prepress operations contained in the deferred operation ticket on the document to produce a processed document and print the processed document.

In an embodiment, a method for adaptively deferring prepress operations for a document may include receiving, by a prepress workflow system, a document and a sequence of prepress operations to be performed on the document, wherein the document comprises one or more pages, identifying, by the prepress workflow system, one or more prepress operations that are deferrable until a raster image processing phase of a workflow, rasterizing each page of the document to produce one or more rasterized page images, processing the one or more rasterized page images using the one or more deferred prepress operations, and printing, by a printing device, the one or more processed rasterized page images.

BRIEF DESCRIPTION OF THE DRAWINGS

Aspects, features, benefits and advantages of the present invention will be apparent with regard to the following description and accompanying drawings, of which.

DETAILED DESCRIPTION

Figure 1:
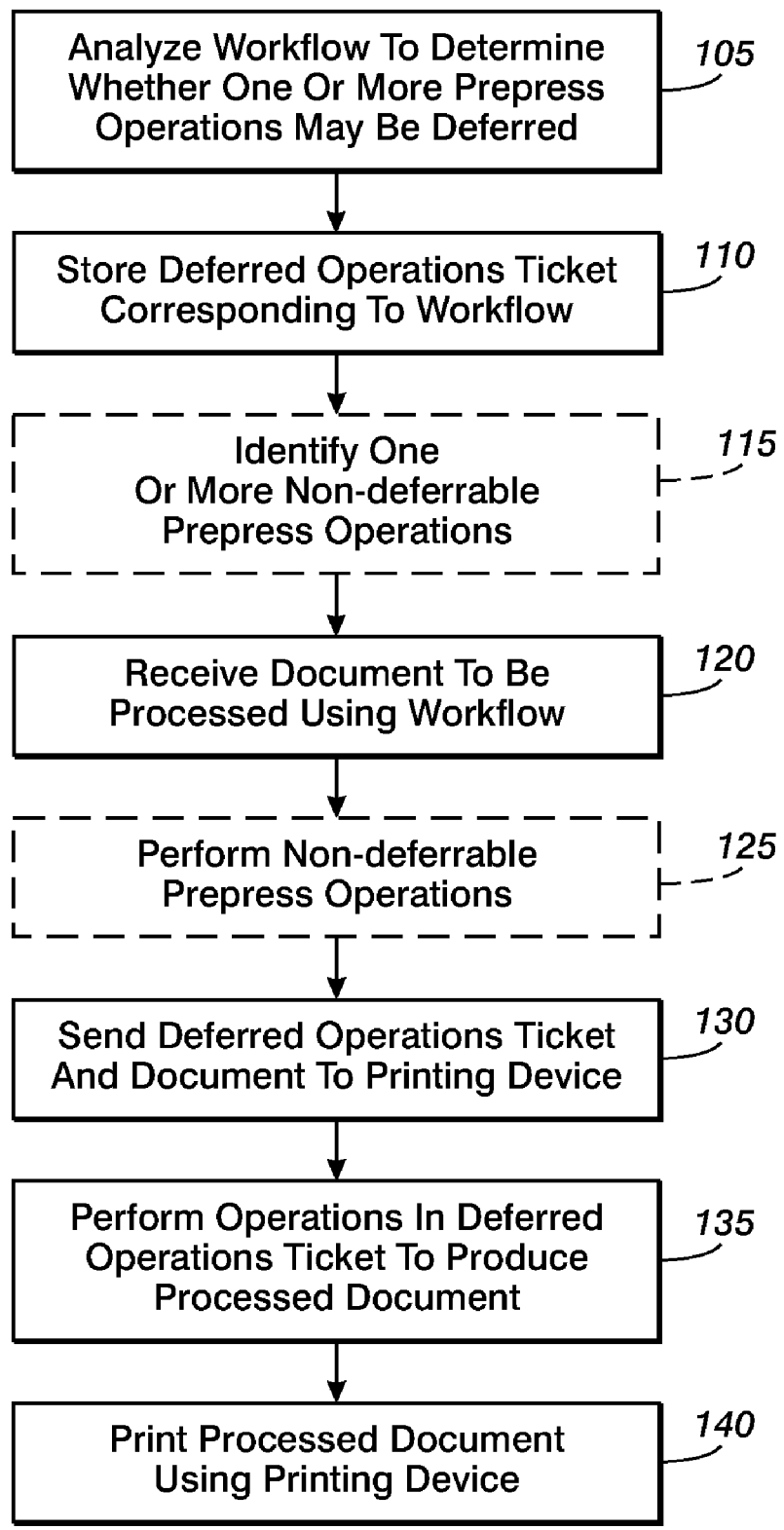
FIG. 1 depicts a flow diagram of an exemplary method of adaptively deferring prepress operations for a workflow according to an embodiment.

The following terms shall have, for the purposes of this application, the respective meanings set forth below.

"Rasterization" or "raster image processing" refers to a process of taking an image described in a vector graphics and/or text-based format and converting it into a raster image (i.e., pixels or dots) for output on a video display or printing device.

A "printing device" refers to an electronic apparatus that is capable of receiving commands, printing text, vector graphics and/or images on a substrate and/or scanning a document. Printing devices may include, but are not limited to, network printers, production printers, copiers, facsimile machines and/or other devices using ink or toner.

A "workflow" refers to an ordered sequence of operations designed to enable repeatable processing of submitted documents. A workflow may include operations that transform a document in some manner and/or result in the display, transmission or conversion into physical form of the document.

A "prepress workflow system" refers to a processor-based system for receiving and processing a workflow prior to sending information to a printing device. A prepress workflow system may include, without limitation, a computer, a stand-alone processor, an embedded system or the like. In addition, a prepress workflow system may further include, without limitation, memory, such as random access memory (RAM), a hard drive and/or the like. A prepress workflow system may be in operable communication with one or more printing devices.

Automated prepress workflow systems may enable the generation of workflows that include discrete prepress operations to be applied in sequence to input documents. Workflows enable automatic performance of such discrete prepress operations to one or more documents. For example, a large number of documents may be passed through a sequence of discrete prepress operations without human intervention if the documents each require similar processing. In an embodiment, a user may select one or more workflows from a plurality of predefined workflows to perform on one or more documents.

An automated prepress workflow system may analyze a workflow to determine if each prepress operation in a sequence associated with the workflow may be deferred to a raster image processing phase when printing an electronic document, such as a PDL document. If one or more prepress operations can be deferred, a deferred operations ticket may be generated that includes such prepress operations. The deferred operations ticket may be passed through the workflow with the electronic document and sent to a printing device. The printing device performs the prepress operations in the deferred operations ticket during a Raster Image Processing (RIP) phase (i.e., a processing phase occurring after the pages of an electronic document have been reduced to raster images).

In an embodiment, one or more prepress operations may be performed on the electronic document to generate an updated electronic document. The one or more prepress operations may be performed on the original electronic document if a last operation of the one or more prepress operations cannot be deferred to the RIP phase of the workflow process. In such an embodiment, prepress operations after the last non-deferrable prepress operation, if any, may be used to generate the deferred operations ticket. As such, the deferred operations ticket and the updated electronic document may be sent to the printing device, which performs the one or more prepress operations in the deferred operations ticket during the RIP phase.

Deferring deferrable prepress operations to the RIP phase of a workflow may produce considerable improvements in performance and reliability. For example, in a PDL document, such as a PDF document, every page of the document may essentially be a database containing a plurality of objects to be processed. When processing large documents or PDL documents containing a large number of heterogeneous objects, applying prepress operations may be time consuming and may result in greatly increasing the size of a document such that system resources could be strained. However, many prepress operations merely require simple transformations that may be applied at the RIP phase.

FIG. 1 depicts a flow diagram of an exemplary method of adaptively deferring prepress operations for a workflow according to an embodiment. As shown in FIG. 1, a prepress workflow system may analyze 105 a workflow to determine whether the performance of one or more prepress operations in the workflow can be deferred to a printing device. In an embodiment, the one or more prepress operations may be in a sequence ordered based on a time order in which the prepress operations are performed. For example, a sequence of prepress operations may be ordered from an initial prepress operation to a final prepress operation. Exemplary prepress operations that can be performed within a workflow may include, without limitation, converting a document from a first page description language to a second page description language; performing color management operations; preflighting to identify potential print incompatibilities; performing imposition, rotation, mirroring, cropping and/or resizing a document or a portion of a document; joining documents; adding one or more pressmarks, such as color bars; and/or adding one or more of a page number, a Bate stamp, text, an image watermark, and a barcode.

In an embodiment, analyzing 105 a workflow may include determining whether a printing device can perform a prepress operation. For example, a printing device may not be able to perform color transformations on a document, but may be able to perform resizing operations. For such an exemplary printing device, a workflow containing color transformation operations would require such operations to be performed by the prepress workflow system, rather than by the printing device.

Figure 2A:
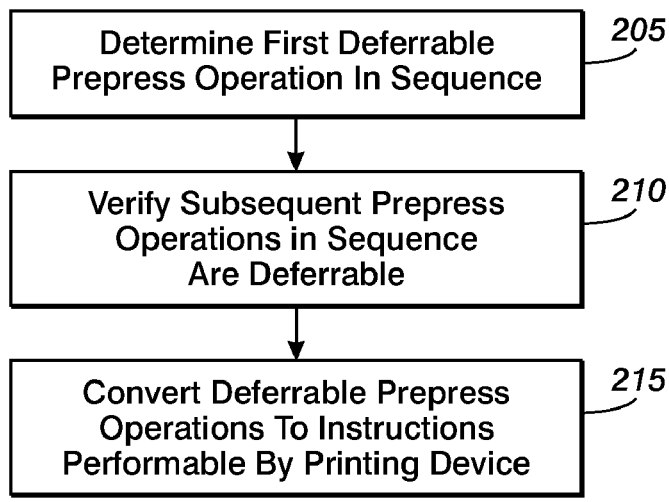
FIGS. 2A and 2B depict flow diagrams for exemplary methods of analyzing a workflow according to embodiments.

FIG. 2A depicts a flow diagram for a first exemplary method of analyzing a workflow according to an embodiment. As shown in FIG. 2A, the prepress workflow system may determine 205 a first prepress operation that is deferrable to a printing device in a sequence of prepress operations in the workflow. The sequence of prepress operations may include a plurality of prepress operations ordered from an initial prepress operation to a final prepress operation. The prepress workflow system may further verify 210 that each prepress operation in the sequence that is subsequent to the first prepress operation is deferrable. Each prepress operation in the sequence from the first prepress operation to the final prepress operation may be converted 215 to a corresponding instruction that is performable by the printing device.

Figure 2B:
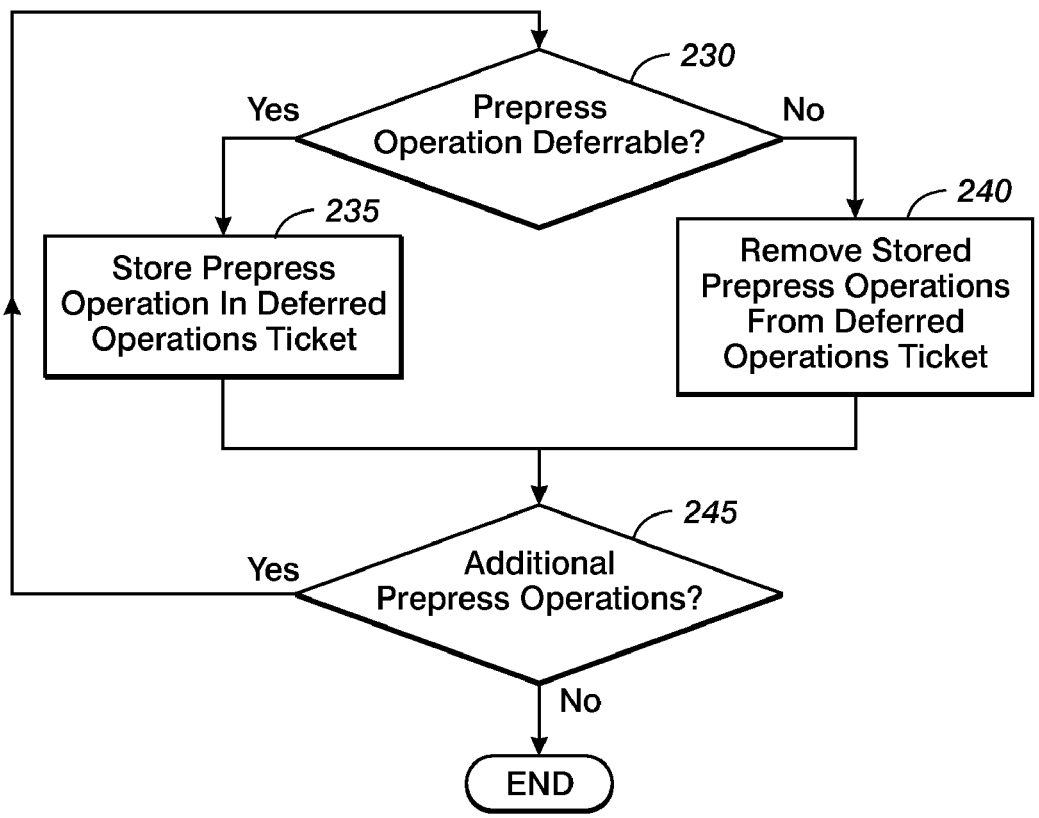

FIG. 2B depicts a flow diagram for a second exemplary method of analyzing a workflow according to an embodiment. As shown in FIG. 2B, the prepress workflow system may determine 230 whether a prepress operation in a sequence of prepress operations is deferrable. If the prepress operation is deferrable, the prepress operation may be stored 235 in a deferred operations ticket. If the prepress operation is not deferrable, each stored prepress operation in the deferred operations ticket may be removed 240 from the deferred operations ticket. The prepress workflow system may then determine 245 whether additional prepress operations are present in the sequence of prepress operations. If so, the process may return to 230 to consider the next prepress operation in the sequence.

Referring back to FIG. 1, a deferred operations ticket corresponding to the workflow may be stored 110. The deferred operations ticket may contain one or more deferrable prepress operations. In an embodiment, the deferred operations ticket may contain each deferrable prepress operation identified according to the analysis performed by the prepress workflow system.

The prepress workflow system may receive 120 a document to be processed using the workflow. In an embodiment, the document may include a text-based or mixed text-graphics document, such as a PDL document, a Microsoft Word® document and/or the like, and/or a graphics document, such as a JPEG file, Bitmap file, and/or the like. The document may include one or more pages and may be in an electronic format.

The deferred operations ticket and the document may be sent 130 to the printing device. The deferred operations ticket may direct the printing device to perform the one or more deferrable prepress operations. The printing device may then perform 135 the one or more prepress operations contained in the deferred operation ticket on the document to produce a processed document. Finally, the printing device may print 140 the processed document.

In an embodiment, the prepress workflow system may identify 115 one or more prepress operations in the workflow that are not deferrable. The prepress workflow system may further perform 125 the one or more non-deferrable prepress operations on the received document.

Figure 3:
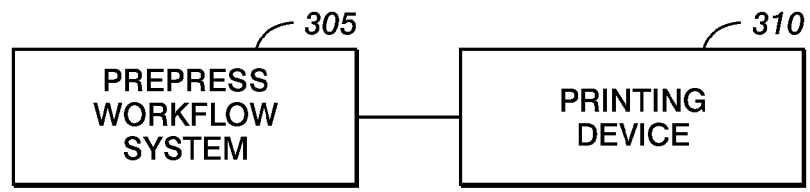
FIG. 3 depicts a block diagram of an exemplary system for adaptively deferring prepress operations for a workflow according to an embodiment.
Figure 6:
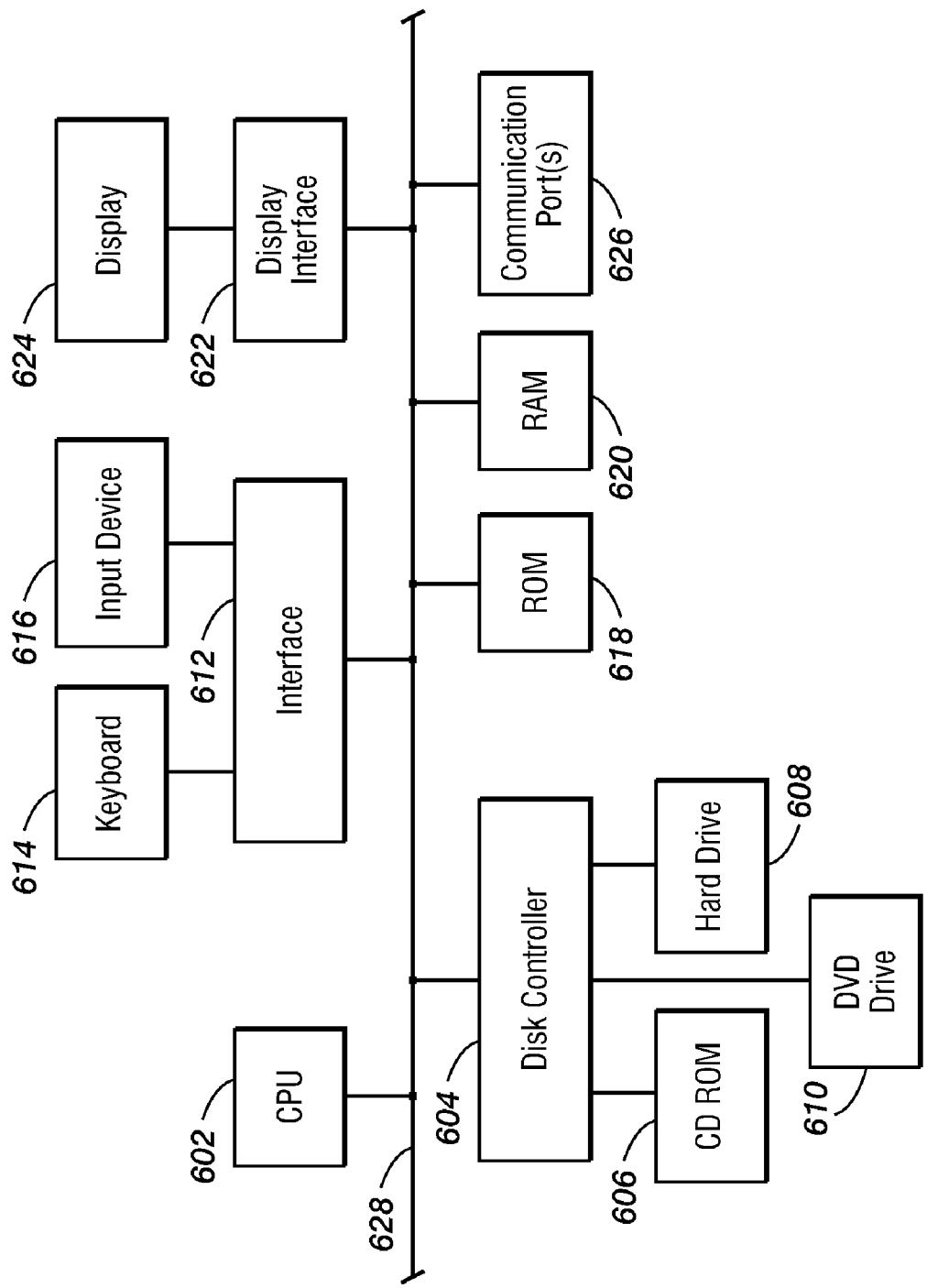
FIG. 6 depicts a block diagram of an exemplary system that may be used to contain or implement program instructions for adaptively deferring prepress operations for a workflow and/or for a document in a workflow according to an embodiment.

FIG. 3 depicts a block diagram of an exemplary system for adaptively deferring prepress operations for a workflow according to an embodiment. As shown in FIG. 3, the system may include a prepress workflow system 305 and a printing device 310 in operable communication with the prepress workflow system. An exemplary system for implementing a prepress workflow system 305 is shown in FIG. 6. In an embodiment, the prepress workflow system may be configured to receive a workflow, analyze the workflow to determine whether the performance of one or more prepress operations in the workflow can be deferred to the printing device 310 and store a deferred operations ticket containing one or more deferrable prepress operations corresponding to the workflow. In an embodiment, analyzing the workflow may include determining whether a prepress operation is performable by the printing device 310.

In an embodiment, analyzing the workflow may include determining a first prepress operation that is deferrable in a sequence of prepress operations that includes a plurality of prepress operations ordered from an initial prepress operation to a final prepress operation, verifying that each prepress operation in the sequence subsequent to the first prepress operation is deferrable, and converting each prepress operation in the sequence from the first prepress operation to the final prepress operation into a corresponding instruction that is performable by the printing device 310.

In an embodiment, analyzing the workflow may include determining whether a prepress operation in a sequence of prepress operations is deferrable, storing the prepress operation in the deferred operations ticket if the prepress operation is deferrable, removing each stored prepress operation from the deferred operations ticket if the prepress operation is not deferrable, and repeating such determining and subsequent storing or removing for each prepress operation in the sequence of prepress operations.

The prepress workflow system 305 may be further configured to receive a document to be processed using the workflow and send the deferred operations ticket and the document to the printing device 310. In an embodiment, the prepress workflow system 305 may be further configured to identify one or more non-deferrable prepress operations in the workflow and perform the one or more non-deferrable prepress operations.

The printing device 310 may be configured to receive the deferred operations ticket and the document from the prepress workflow system, perform the one or more prepress operations contained in the deferred operation ticket on the document to produce a processed document and print the processed document.

Figure 4:
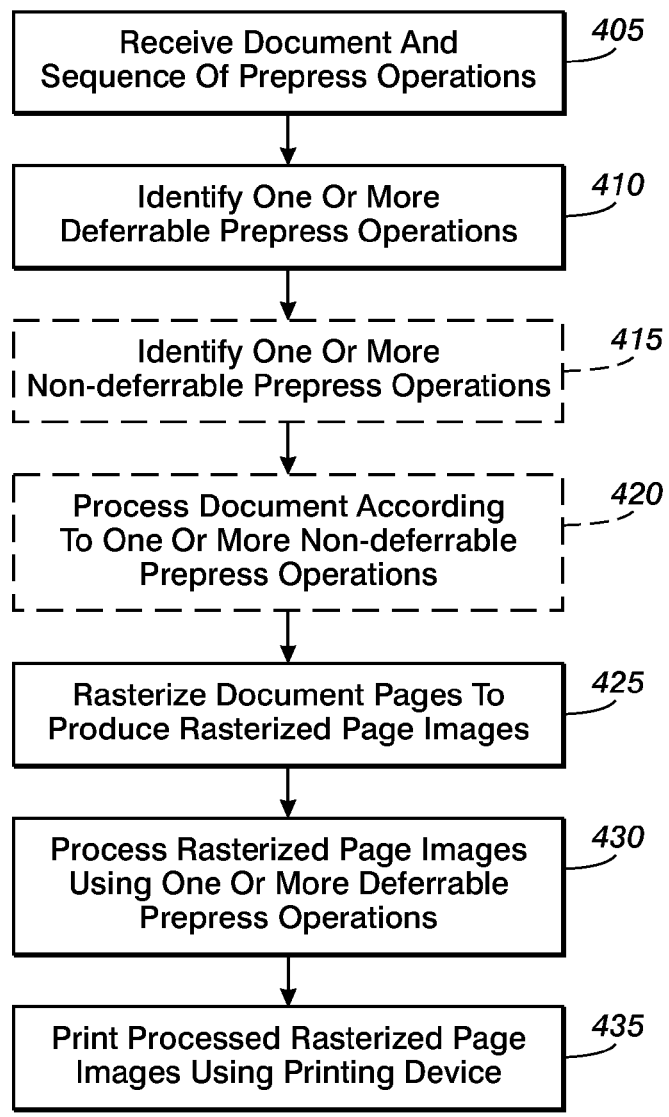
FIG. 4 depicts a flow diagram of an exemplary method of adaptively deferring prepress operations for a document in a workflow environment according to an embodiment.

FIG. 4 depicts a flow diagram of an exemplary method of adaptively deferring prepress operations for a document in a workflow environment according to an embodiment. As shown in FIG. 4, a document and a sequence of prepress operations may be received 405 by a prepress workflow system.

In an embodiment, the sequence of prepress operations may include a plurality of prepress operations that are ordered based on a time order in which the operations are processed. For example, a sequence of prepress operations may be ordered from an initial prepress operation to a final prepress operation.

An automated prepress workflow system may identify 410 one or more of the received prepress operations to be deferrable until the RIP phase of the workflow. Identifying 410 whether prepress operations are deferrable until the RIP phase may be performed in a variety of ways.

Figure 5A:
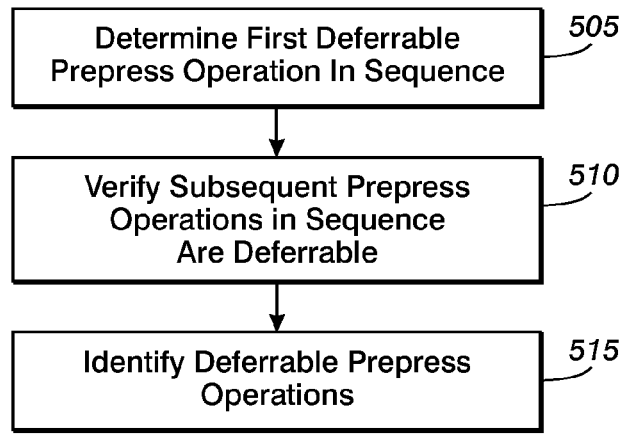
FIGS. 5A and 5B depict flow diagrams for exemplary methods of identifying whether prepress operations are deferrable until a raster image processing phase of a workflow according to embodiments.

FIG. 5A depicts a flow diagram for a first exemplary method of identifying whether prepress operations are deferrable until a RIP phase of a workflow according to an embodiment. As shown in FIG. 5A, the prepress workflow system may identify the one or more deferrable prepress operations by determining 505 a first prepress operation in the sequence that is deferrable until the RIP phase. Each subsequent prepress operation in the sequence may be verified 510 by the prepress workflow system to be deferrable until the RIP phase as well. The prepress workflow system may identify 515 each prepress operation from the first prepress operation to the final prepress operation to be deferrable. In an embodiment, the deferrable prepress operations may be stored in a deferred operations ticket.

Figure 5B:
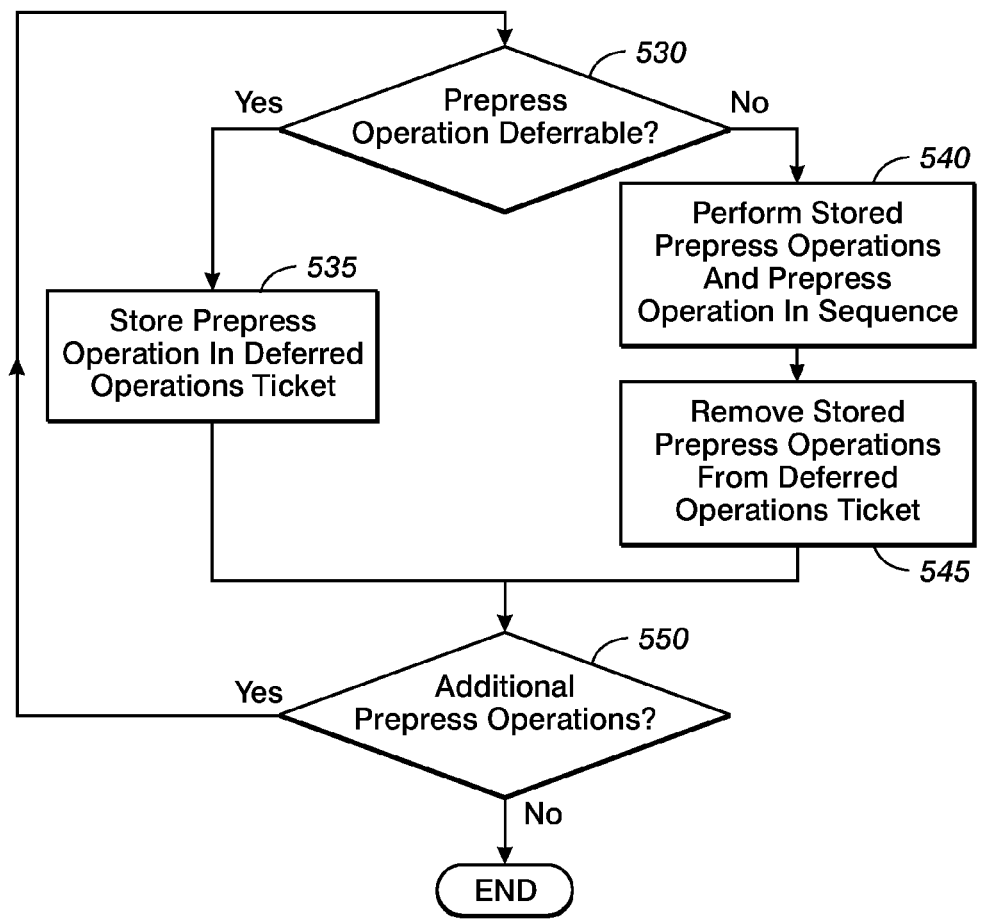

FIG. 5B depicts a flow diagram for a second exemplary method of identifying whether prepress operations are deferrable until a RIP phase of a workflow according to an embodiment. As shown in FIG. 5B, the prepress workflow system may identify the one or more deferrable prepress operations by determining 530 whether a prepress operation in the sequence of prepress operations is deferrable. If the prepress operation is deferrable, the prepress operation may be stored 535 in a deferred operations ticket. If the prepress operation is not deferrable, each prepress operation stored in the deferred operations ticket and the prepress operation may be performed 540 in sequence on the document. Each prepress operation in the deferred operations ticket may also be removed 545 from the deferred operations ticket. The prepress workflow system may then determine 550 whether additional prepress operations are present in the sequence of prepress operations. If so, the process may return to 530 to consider the next prepress operation in the sequence.

Referring back to FIG. 4, in an embodiment, one or more prepress operations that are not deferrable until the RIP phase of the workflow may be identified 415. The document may be processed 420 according to the one or more non-deferrable operations prior to the RIP phase of the workflow.

Each page of the document, as modified by the non-deferred prepress operation, if any, may be rasterized 425 to produce one or more rasterized page images. The one or more rasterized page images may be processed 430 using the one or more deferred prepress operations. In an embodiment, processing 430 the rasterized page images may be performed by a printing device and/or a processor associated with a printing device. The one or more processed rasterized page images may then be printed 435 using a printing device.

FIG. 6 depicts a block diagram of an exemplary system that may be used to contain or implement program instructions for assessing color gamut requirements for a print job and a printing device according to an embodiment. Referring to FIG. 6, a bus 628 serves as the main information highway interconnecting the other illustrated components of the hardware. CPU 602 is the central processing unit of the system, performing calculations and logic operations required to execute a program. Read only memory (ROM) 618 and random access memory (RAM) 620 constitute exemplary memory devices or storage media.

A disk controller 604 interfaces with one or more optional disk drives to the system bus 628. These disk drives may include, for example, external or internal DVD drives 610, CD ROM drives 606 or hard drives 608. As indicated previously, these various disk drives and disk controllers are optional devices.

Program instructions may be stored in the ROM 618 and/or the RAM 620. Optionally, program instructions may be stored on a computer readable storage medium, such as a hard drive, a flash drive, a compact disk, a digital disk, a memory or any other tangible recording medium.

An optional display interface 622 may permit information from the bus 628 to be displayed on the display 624 in audio, graphic or alphanumeric format. Communication with external devices may occur using various communication ports 626.

In addition to the standard computer-type components, the hardware may also include an interface 612 which allows for receipt of data from input devices such as a keyboard 614 or other input device 616 such as a mouse, remote control, pointer and/or joystick.

An embedded system may optionally be used to perform one, some or all of the operations described herein. Likewise, a multiprocessor system may optionally be used to perform one, some or all of the operations described herein.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the disclosed embodiments.

What is claimed is:

1. A method for adaptively deferring prepress operations for a workflow, the method comprising;
analyzing, by a prepress workflow system, a workflow to determine whether the performance of one or more prepress operations acting on print objects described in a vector graphics and/or text-based format in the workflow can be deferred to a printing device; and can be replaced with equivalent operations acting on said objects described in a raster format
storing a deferred operations ticket corresponding to the workflow, wherein the deferred operations ticket contains one or more deferrable prepress operations;
receiving, by the prepress workflow system, a document to be processed by the workflow;
sending the document and the deferred operations ticket to the printing device;
performing, by the printing device, the one or more deferrable prepress operations contained in the deferred operations ticket on the document to produce a processed document; and
printing the processed document.

2. The method of claim 1, further comprising:
identifying, by the prepress workflow system, one or more non-deferrable prepress operations in the workflow; and
performing the one or more non-deferrable prepress operations at the prepress workflow system on the received document.

3. The method of claim 1 wherein analyzing a workflow comprises determining whether a prepress operation is performable by the printing device.

4. The method of claim 1 wherein analyzing a workflow comprises:
determining a first prepress operation that is deferrable in a sequence of prepress operations in the workflow, wherein the sequence comprises a plurality of prepress operations ordered from an initial prepress operation to a final prepress operation;
verifying that each prepress operation in the sequence subsequent to the first prepress operation is deferrable; and
converting each prepress operation in the sequence from the first prepress operation to the final prepress operation into a corresponding instruction that is performable by the printing device.

5. The method of claim 1 wherein analyzing a workflow comprises:
determining whether a prepress operation in a sequence of prepress operations is deferrable;
if the prepress operation is deferrable, storing the prepress operation in the deferred operations ticket;
if the prepress operation is not deferrable, removing each stored prepress operation from the deferred operations ticket, and
repeating the determining, storing and removing for each prepress operation in the sequence of prepress operations.

6. A system for adaptively deferring prepress operations for a workflow, the method comprising:
a prepress workflow system configured to:
receive a workflow,
analyze the workflow to determine whether the performance of one or more prepress operations acting on print objects described in a vector graphics and/or text-based format in the workflow can be deferred to the printing device, and can be replaced with equivalent operations acting on said objects described in a raster format
store a deferred operations ticket containing one or more deferrable prepress operations corresponding to the workflow,
receive a document to be processed using the workflow, and
send the deferred operations ticket and the document to the printing device; and
a printing device in operable communication with the prepress workflow system, wherein the printing device is configured to:
perform the one or more prepress operations contained in the deferred operation ticket on the document to produce a processed document, and
print the processed document.

7. The system of claim 6 wherein the prepress workflow system is further configured to:

identify one or more non-deferrable prepress operations in the workflow; and perform the one or more non-deferrable prepress operations.

8. The system of claim 6 wherein analyzing the workflow comprises determining whether a prepress operation is performable by the printing device.

9. The system of claim 6 wherein analyzing the workflow comprises:
   determining a first prepress operation that is deferrable in a sequence of prepress operations in the workflow, wherein the sequence comprises a plurality of prepress operations ordered from an initial prepress operation to a final prepress operation;
   verifying that each prepress operation in the sequence subsequent to the first prepress operation is deferrable; and
   converting each prepress operation in the sequence from the first prepress operation to the final prepress operation into a corresponding instruction that is performable by the printing device.

10. The system of claim 6 wherein analyzing the workflow comprises:
    determining whether a prepress operation in a sequence of prepress operations is deferrable;
    if the prepress operation is deferrable, storing the prepress operation in the deferred operations ticket;
    if the prepress operation is not deferrable, removing each stored prepress operation from the deferred operations ticket; and
    repeating the determining, storing and removing for each prepress operation in the sequence of prepress operations.

11. A method for adaptively deferring prepress operations for a document, the method comprising:
    receiving, by a prepress workflow system, a document and a sequence of prepress operations to be performed on the document, wherein the document comprises one or more pages;
    identifying, by the prepress workflow system, one or more prepress operations acting on print objects described in a vector graphics and/or text-based format that are deferrable until a raster image processing phase of a workflow;
    rasterizing, by the prepress workflow system, each page of the document to produce one or more rasterized page images;
    processing the one or more rasterized page images using the one or more deferred prepress operations; and acting on said objects described in a raster format
    printing, by a printing device, the one or more processed rasterized page images.

12. The method of claim 11, further comprising:
    identifying, by the prepress workflow system, one or more prepress operations that are not deferrable until the raster image processing phase of the workflow; and
    processing the document using the one or more non-deferrable prepress operations prior to the raster image processing phase of the workflow.

13. The method of claim 11 wherein the sequence comprises a plurality of prepress operations ordered from an initial prepress operation to a final prepress operation, and wherein identifying one or more prepress operations that are deferrable comprises:
    determining a first prepress operation that is deferrable until the raster image processing phase in the sequence;
    verifying that each prepress operation in the sequence subsequent to the first prepress operation is deferrable until the raster image processing phase; and
    identifying each prepress operation in the sequence from the first prepress operation to the final prepress operation as a deferred prepress operation.

14. The method of claim 11 wherein identifying one or more prepress operations that are deferrable comprises:
    determining whether a prepress operation in the sequence is deferrable;
    if the prepress operation is deferrable, storing the prepress operation in a deferred operations ticket;
    if the prepress operation is not deferrable:
        performing each stored prepress operation in the deferred operations ticket and the prepress operation, in sequence, on the document, and
        removing each prepress operation from the deferred operations ticket; and
    repeating the determining, storing, performing and removing for each prepress operation in the sequence of prepress operations.

* * * * *